(12) United States Patent
Shintani et al.

(10) Patent No.: US 12,720,281 B2
(45) Date of Patent: Aug. 25, 2026

(54) REMOTE CONTROL USING ATSC 3.0

(71) Applicant: Sony Group Corporation, Tokyo (JP)

(72) Inventors: Peter Shintani, San Diego, CA (US); Fred Ansfield, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 395 days.

(21) Appl. No.: 18/304,525

(22) Filed: Apr. 21, 2023

(65) Prior Publication Data

US 2024/0357324 A1 Oct. 24, 2024

(51) Int. Cl.
*H04W 4/12* (2009.01)
*H04H 20/72* (2008.01)

(52) U.S. Cl.
CPC .............. *H04W 4/12* (2013.01); *H04H 20/72* (2013.01)

(58) Field of Classification Search
CPC ................................ H04W 4/12; H04H 20/72
USPC .......................................................... 370/329
See application file for complete search history.

(56) References Cited

U.S. PATENT DOCUMENTS

| | | | | |
|---|---|---|---|---|
| 2008/0018494 | A1* | 1/2008 | Waite | H05B 47/19 340/407.1 |
| 2016/0330525 | A1* | 11/2016 | Freeman | H04L 67/02 |
| 2017/0177449 | A1 | 6/2017 | Bronk | |
| 2019/0201966 | A1* | 7/2019 | Khansa | H01R 43/058 |
| 2019/0342702 | A1* | 11/2019 | Shinar | G06Q 10/08 |
| 2021/0010315 | A1 | 1/2021 | Honjo | |
| 2021/0248211 | A1 | 8/2021 | Goldberg | |
| 2022/0124401 | A1 | 4/2022 | Fay | |

* cited by examiner

*Primary Examiner* — Hermon Asres
(74) *Attorney, Agent, or Firm* — John L. Rogitz; John M. Rogitz

(57) ABSTRACT

ATSC 3.0 IP-based data is broadcast in signed and encrypted messages to one or more ATSC 3.0 receivers that control a barrier such as a gate, usually closed to traffic, in the event of an emergency, such as a fire, to open the barrier to allow additional escape routes or to provide access for emergency vehicles. The ATSC 3.0 system supports a wake-up mechanism which allows a receiver to go to a power saving mode. Periodically the receiver wakes up to check for the wake-up bit. Receipt of an "open" message actuates a battery powered or solar assisted system to open the gate while saving on power consumption. Present techniques can also be used to send messages such as Amber alerts to roads, freeways, and other public signage and to control remote water pumping and sewer pumping stations which currently depend on point-to-point UHF radio links.

10 Claims, 10 Drawing Sheets

REMOTE CONTROL USING ATSC 3.0

FIELD

The present application relates to technically inventive, non-routine electronic glossary solutions that are necessarily rooted in computer technology and that produce concrete technical improvements, particularly to Remote Control Using ATSC 3.0.

BACKGROUND

Digital TV and in particular digital broadcast TV using the standard known as Advanced Television Systems Committee (ATSC) 3.0 has been introduced to usefully provide broadcast digital TV content to receivers using both terrestrial broadcast transmitters and computer networks.

SUMMARY

Present principles understand that to open access gates or other control barriers, normally a person or persons are required to receive a message either by phone, text, or email and that person has to be available to open the gate. This leaves much to be desired. For instance, the person may be away or unavailable. Keys must be provided in advance and may be lost. Accordingly, present principles divulge techniques to use ATSC 3.0 broadcast to send targeted, signed, and encrypted data for controlling remote access gates.

Accordingly, techniques are provided for remote telemetry control using ATSC 3.0, which is IP based and has the ability for signed messages. Encryption/addressing can be at the individual or group levels. A message can be sent from a broadcast television station to a single or plural receiver(s). The message can be encrypted for security and signed. The message can then be received, decoded then used to control a gate that is usually closed to prevent traffic. In the event of an emergency, such as a fire, the gate is normally opened manually by a person. ATSC 3.0 can be used to broadcast a targeted message to open a gate to allow additional escape routes or to provide access for emergency vehicles. Use of the advanced emergency alert (AEA) of ATSC 3.0 standard is contemplated. The ATSC 3.0 system supports a wake-up mechanism which allows a receiver to go to a power saving mode. Periodically the receiver wakes up to check for the wake-up bit. This would lead to very easy implementation of a battery powered or solar assisted system as power consumption is low. Alternate uses include sending messages to road, freeway, and other public signage. Amber alerts can be sent to freeway billboard signs using ATSC 3.0. Another alternate use is to control remote water pumping and sewer pumping stations which currently depend on point-to-point UHF radio links.

Accordingly, an apparatus includes at least one computer memory that is not a transitory signal and that in turn includes instructions executable by at least one processor to receive an advanced systems television committee (ATSC) 3.0 message, and responsive to the message, actuate a physical barrier to move from a closed to an open configuration.

The physical barrier can include a gate or a door or other barrier.

The message may be digitally signed, in which case the instructions are executable to verify a signature of the message. The message may be encrypted, in which case the instructions are executable to decrypt the message.

The message can be received via terrestrial broadcast. In addition or alternatively, the message can be received via ATSC 3.0 computer network communications.

In an example, the apparatus can include at least one ATSC 3.0 receiver and the instructions can be executable to configure the receiver in a sleep mode. The instructions can be executable to periodically wake up the receiver to check for a wake-up bit in a digital TV broadcast, and responsive to receiving the wake-up bit, actuate a battery powered and/or solar assisted system to open the barrier.

In another aspect, a method includes identifying at last one message to be presented on at least one public sign, and broadcasting the message via advanced systems television committee (ATSC) 3.0 to at least one receiver to cause the public sign to present the message.

In another aspect, an apparatus includes at least one processor configured to receive an advanced systems television committee (ATSC) 3.0 message, and responsive to the message, control at least one fluid pump at a pumping station to pump fluid.

The details of the present application, both as to its structure and operation, can best be understood in reference to the accompanying drawings, in which like reference numerals refer to like parts, and in which:

DETAILED DESCRIPTION

Figure 1:
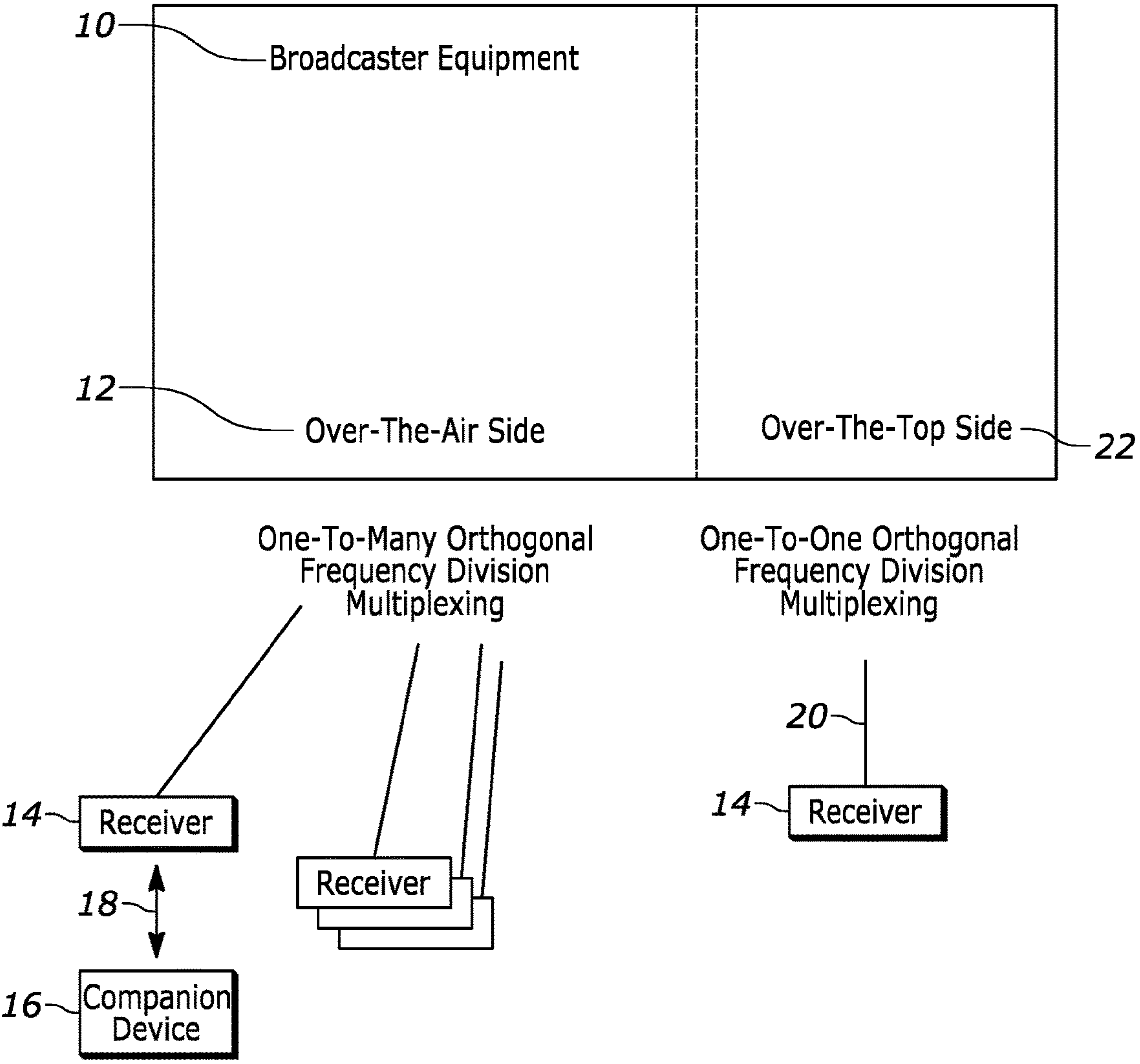
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/331, Annex A, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"An [element] having at least one of A, B, and C" (likewise "having at least one of A, B, or C" and "having at least one of A, B, C") includes A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. A receiver 14 may have both non-persistent memory 14A such as certain types of solid-state RAM and persistent memory 14B such as flash. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned—to ATSC 3.0 television channel and may also receive related content, including television, OTT (broadband). Note that computerized devices described in all of the figures herein may include some or all of the components set forth for various devices in FIGS. 1 and 2.

Figure 2:
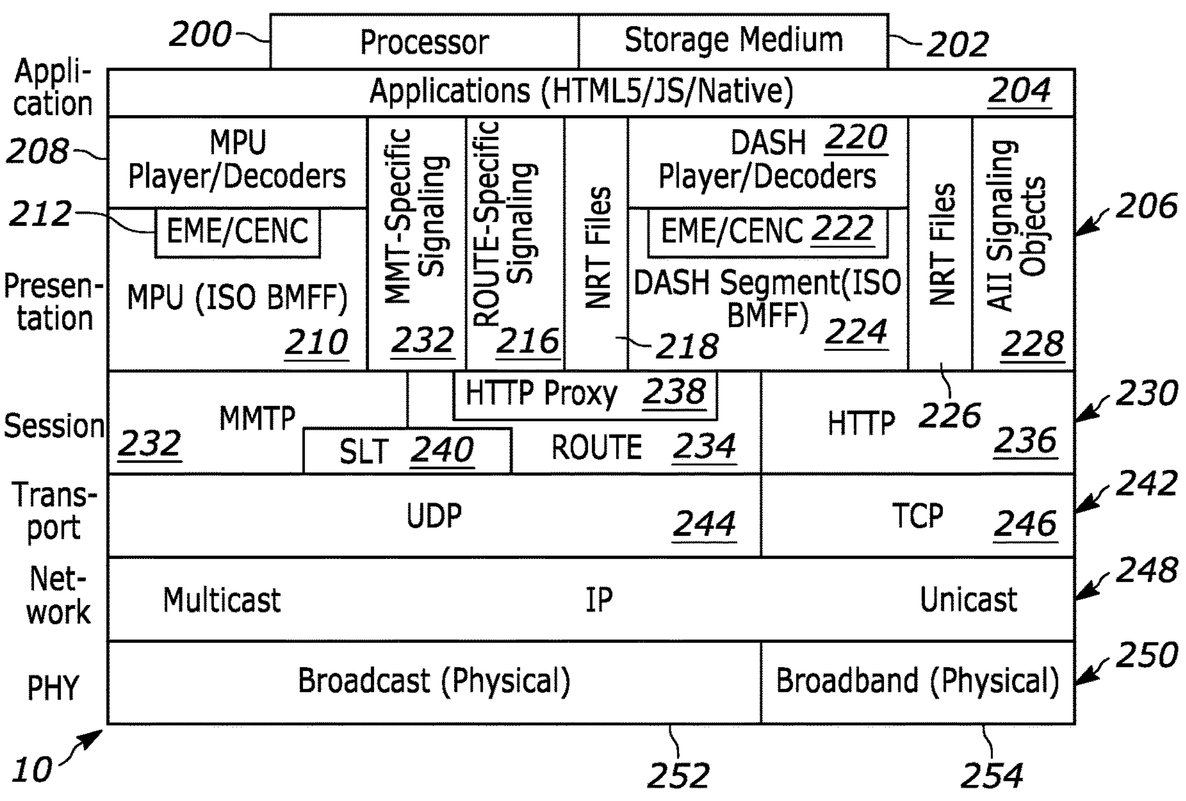
FIG. 2 illustrates components of the devices shown in FIG. 1.
Figure 2:
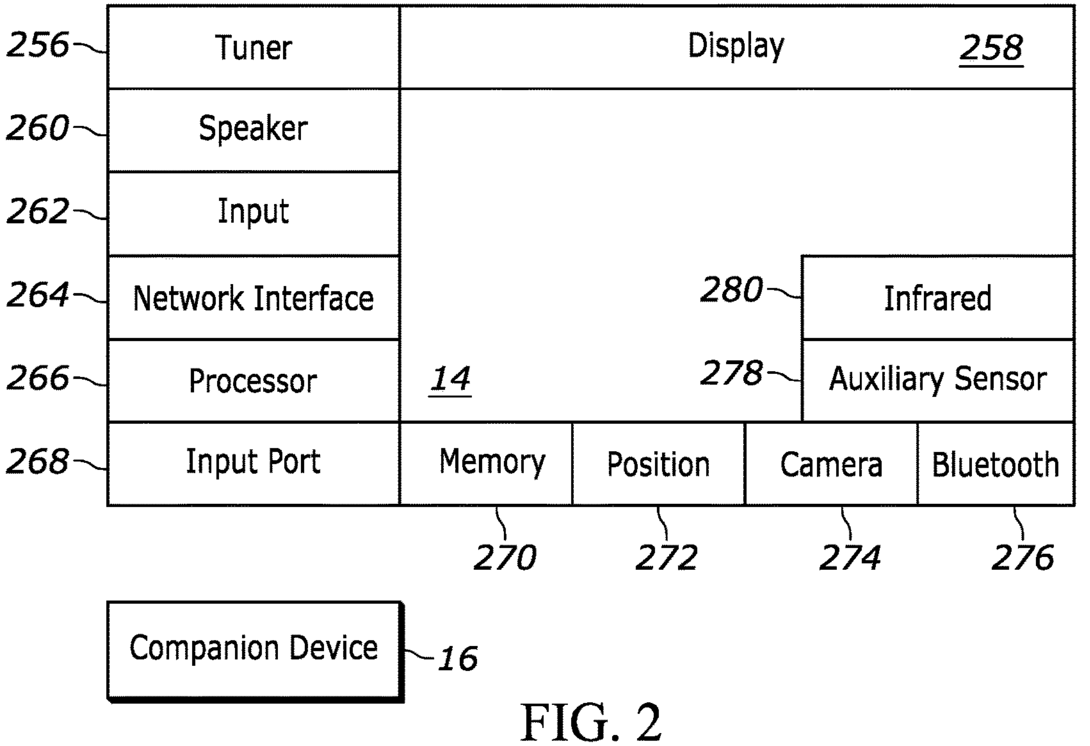

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects, each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing playback signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 may also employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/ microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
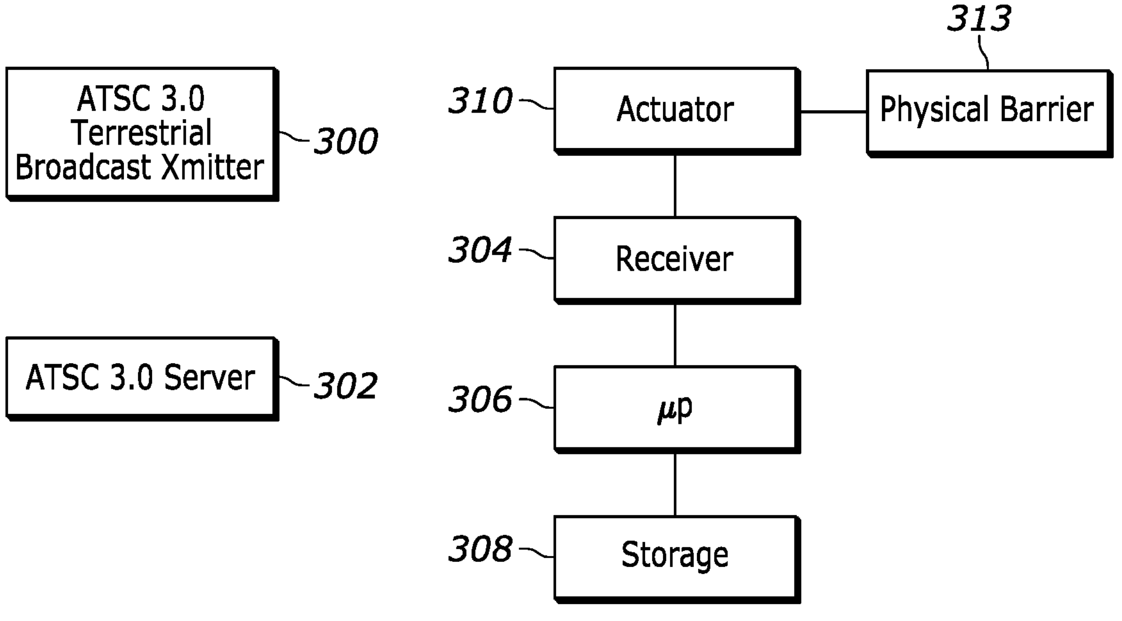
FIG. 3 illustrates a block diagram of an example system consistent with present principles.

Now referring to FIG. 3, a digital TV terrestrial broadcast transmitter 300 and/or ATSC 3.0 server 302 with wireless Internet transmission capability sends a wireless signal to one or more receivers 304 associated with one or more processors 306 accessing one or more storage media 308 to control one or more actuators 310 to move, as by opening, one or more physical barriers 312. Opening may also include unlocking an electronically-controlled lock. Alternatively, wired communication may be used. As indicated in FIG. 3, the electrical components shown on the receiver side may be partially or entirely powered by one or more batteries and/or one or more solar cells directly or via the battery.

The actuator 310 may include, for example, one or more of servo motors, direct current (DC) stepper motors coupled to the barrier 312 by a coupling such as a rack and pinion, or other suitable actuators for moving typically hinged closure barriers.

Figure 4:
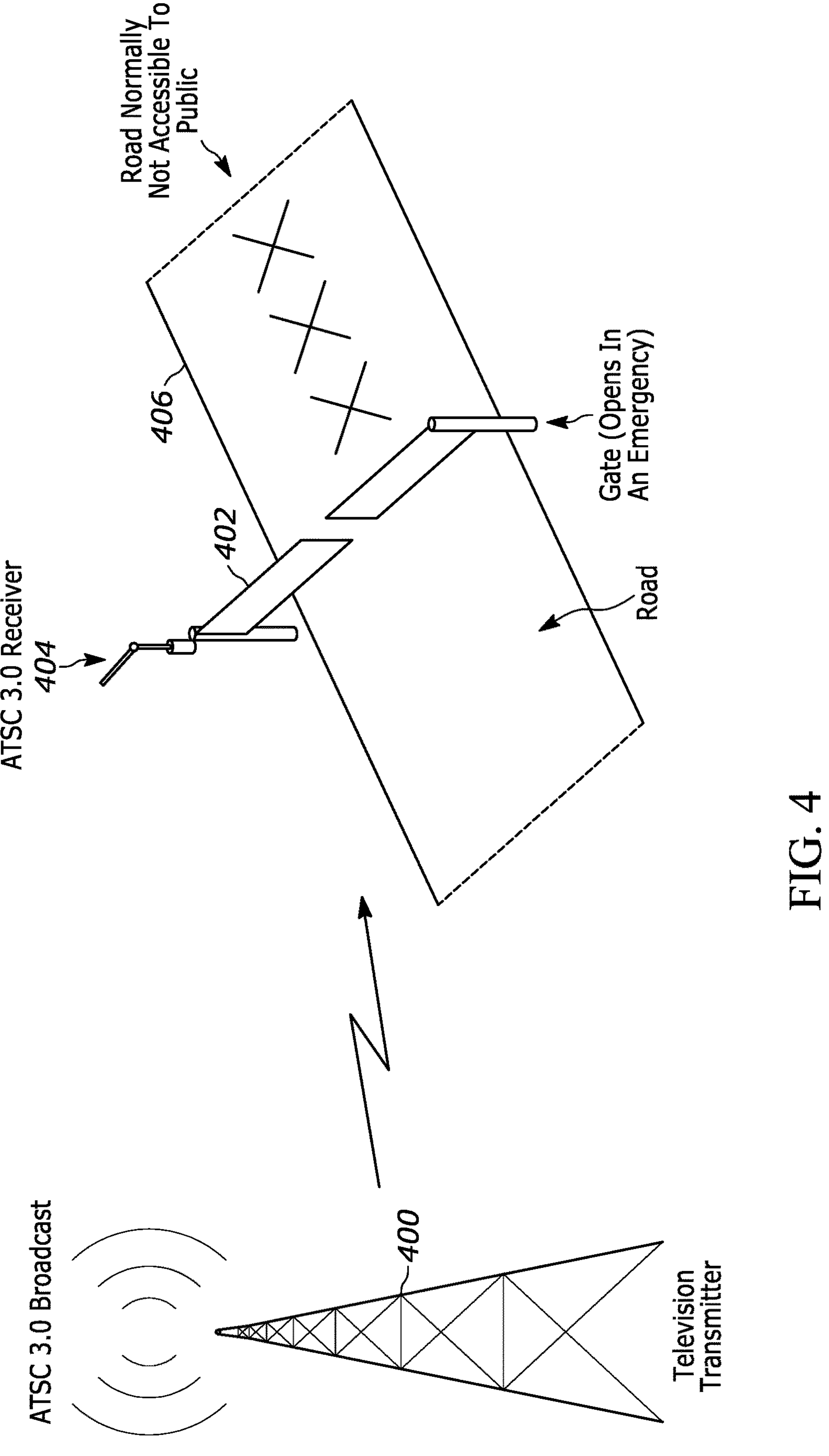
FIG. 4 illustrates a controlled gate to block and unblock an access.
Figure 5:
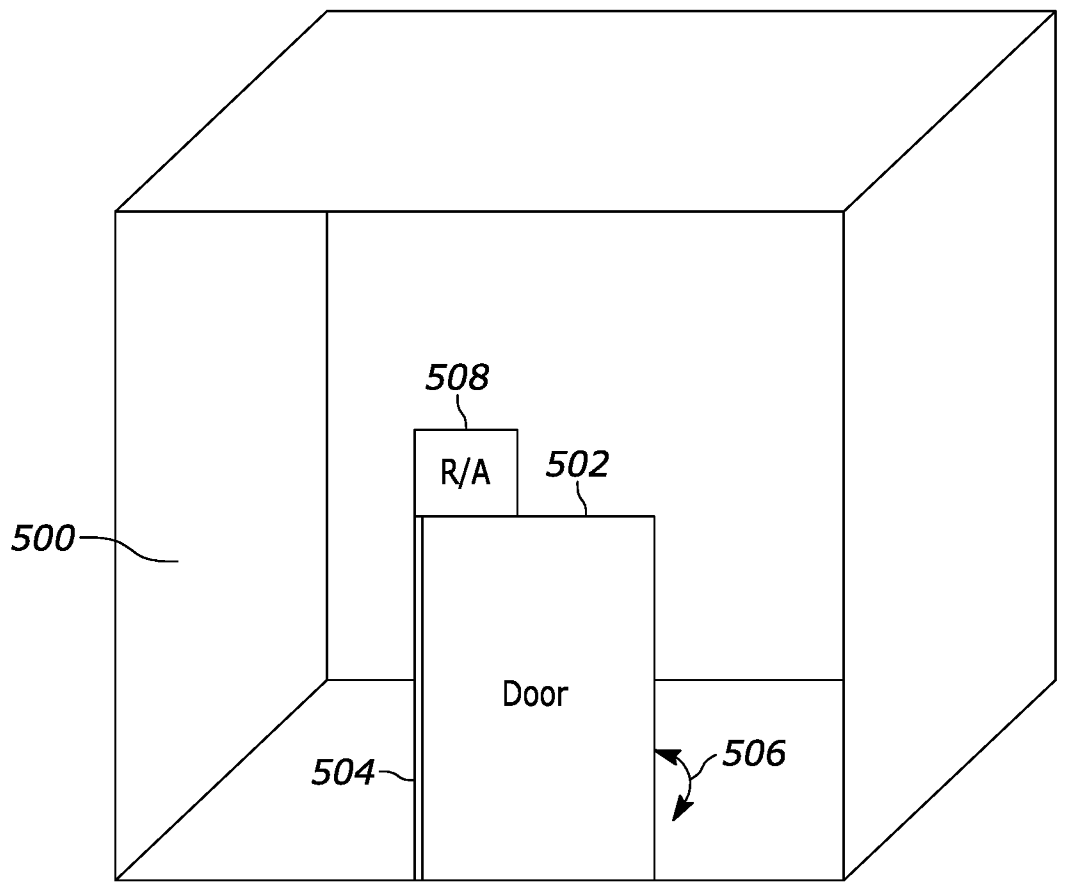
FIG. 5 illustrates a controlled door to block and unblock a room.

FIGS. 4 and 5 illustrate example types of barriers. In FIG. 4, an ATSC 3.0 terrestrial broadcast transmitter 400 controls a gate 402 by means of sending ATSC 3.0 IP-based open and close messages to an ATSC 3.0 receiver 404 associated with the gate. For example, in an emergency in which it is desired to allow access on a road 406 guarded by the gate 402, an "open" message can be sent to the receiver 404 to cause the receiver 404 to open the gate to allow passage of vehicles through the gate on the road 406.

In FIG. 5, access to a room 500 through a door 502 that moves about a hinge 504 between open and closed positions as indicated by the arrows 506 may be afforded by broadcasting via ATSC 3.0 terrestrial broadcast an "open" message to a receiver/actuator 508 to move the door 502 from the closed to the open configuration to permit access past the door into and out of the room 500.

Figure 6:
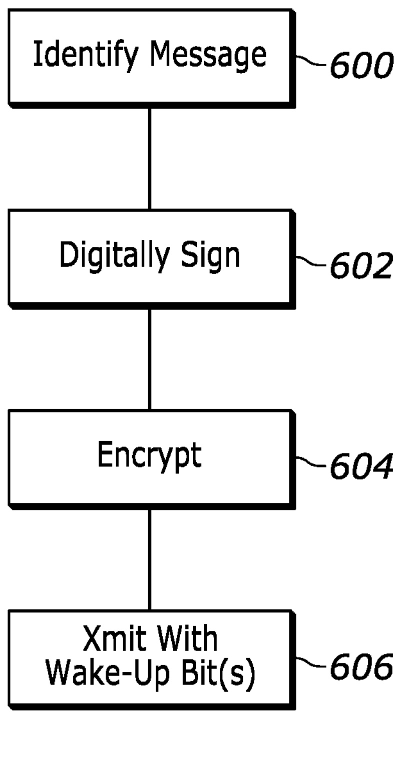
FIG. 6 illustrates example transmitter logic in example flow chart format.

FIG. 6 illustrates transmitter side logic consistent with techniques herein. Commencing at block 600, a message to be sent is identified. The message may be provided by emergency system or other public "service" employees via computer link with the ATSC 3.0 transmitter system. The message may be provided in non-IP format and converted to suitable ATSC 3.0 format such as IP or it may be provided directly in ATSC 3.0 format. The message may be provided manually or automatically, e.g., in response to a sensor near a closed access point such as the gate 402 in FIG. 4 or door 502 in FIG. 5 indicating an emergency. Examples of such sensors include smoke detectors (for fire), motion detectors (for intruder alerts), water detectors (for floods), temperature and humidity detectors and gas detectors such as carbon monoxide detectors (to indicate biologically unsafe conditions), and earthquake detectors. Thus, the messages broadcast by ATSC 3.0 to open barriers may be automatically generated and sent by the system in response to signals from one or more sensors indicating physical conditions at or near a barrier sought to be opened or closed.

Also at block 600, the identity of the ATSC 3.0 receiver may be indicated in the message and correlated to one or more ATSC 3.0 terrestrial broadcast frequencies the receiver is known to be programmed to tune to. All barrier ATSC 3.0 receivers may, for example, be tuned to a common emergency channel, or some receivers may be tuned to one channel and other receivers tuned to a second channel, or all receivers may be tuned to their own respective channels, or the channel to which the target receiver is tuned may not be known at all, in which case the message can be transmitted on some or all of the available ATSC 3.0 channels in the region.

If desired, at block 602 the message may be digitally signed using, for instance, Rivest-Shamir-Adelman (RSA) digital signature techniques, and in general public key-private key signature techniques such as the digital signature algorithm (DSA).

Furthermore, if desired the message may be encrypted at block 604 using techniques such as data encryption standard (DES) or advanced encryption standard (AES). Proceeding to block 606, the message is transmitted by one or more ATSC 3.0 broadcast transmitters along with wake-up bit(s) for purposes to be shortly disclosed.

Figure 7:
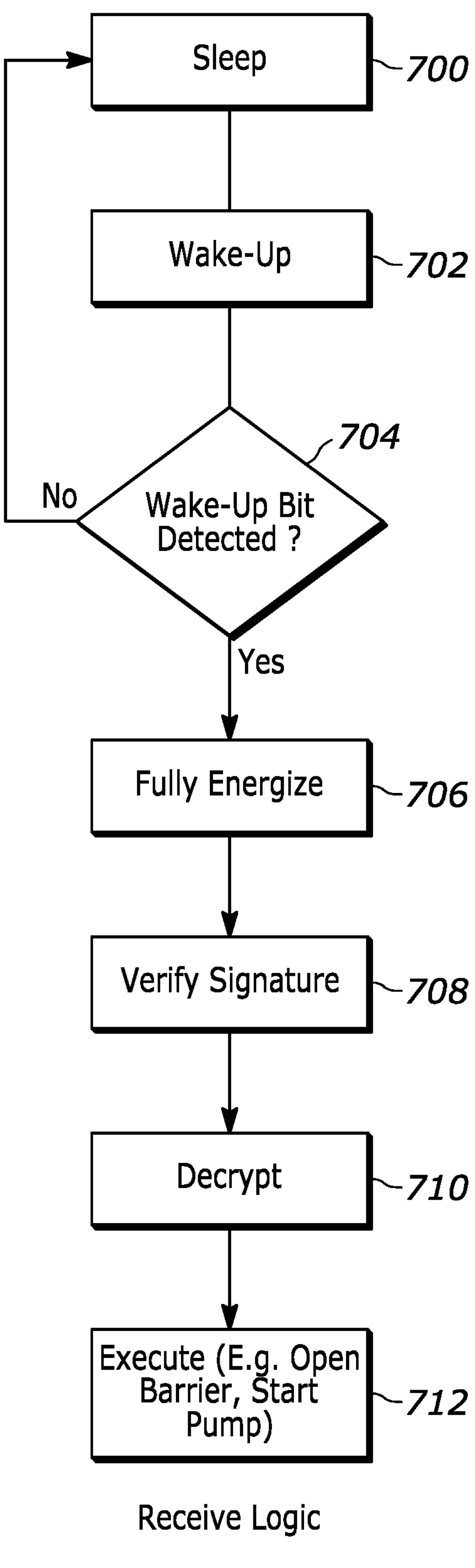
FIG. 7 illustrates example receiver logic in example flow chart format.

FIG. 7 illustrates receiver side logic. Assume a configuration in which the receiver side has a low power state, commonly known as a sleep state, and is in the sleep state at block 700, it being understood that present principles apply to systems without such a state when, for example, electrical power from the grid is available to power the receiver system. Periodically, the receiver system wakes up at state 702 to determine if one or more wake-up bits have been received via ATSC 3.0 transmission. If not, the system can go back to sleep until the next wake-up cycle.

However, when a wake-up bit is detected, the logic moves to state 706 to fully energize the receiver system including all of its processing capability and barrier actuation components to fully receive the message sent using the logic of FIG. 6. In some embodiments, unless the message is both signed and encrypted, it is ignored. If it is signed, at state 708 the digital signature is verified. If verification passes the message is decrypted at state 710. States 708 and 710 may be reversed if desired. The message is then executed at state 712 by, for example, opening a barrier such as the gate 402 or door 502 or starting a pump or publicly presenting the message as explained further below.

It is to be understood that the signature/encryption principles discussed above may also be implemented in the alternate use cases described below.

Figure 8:
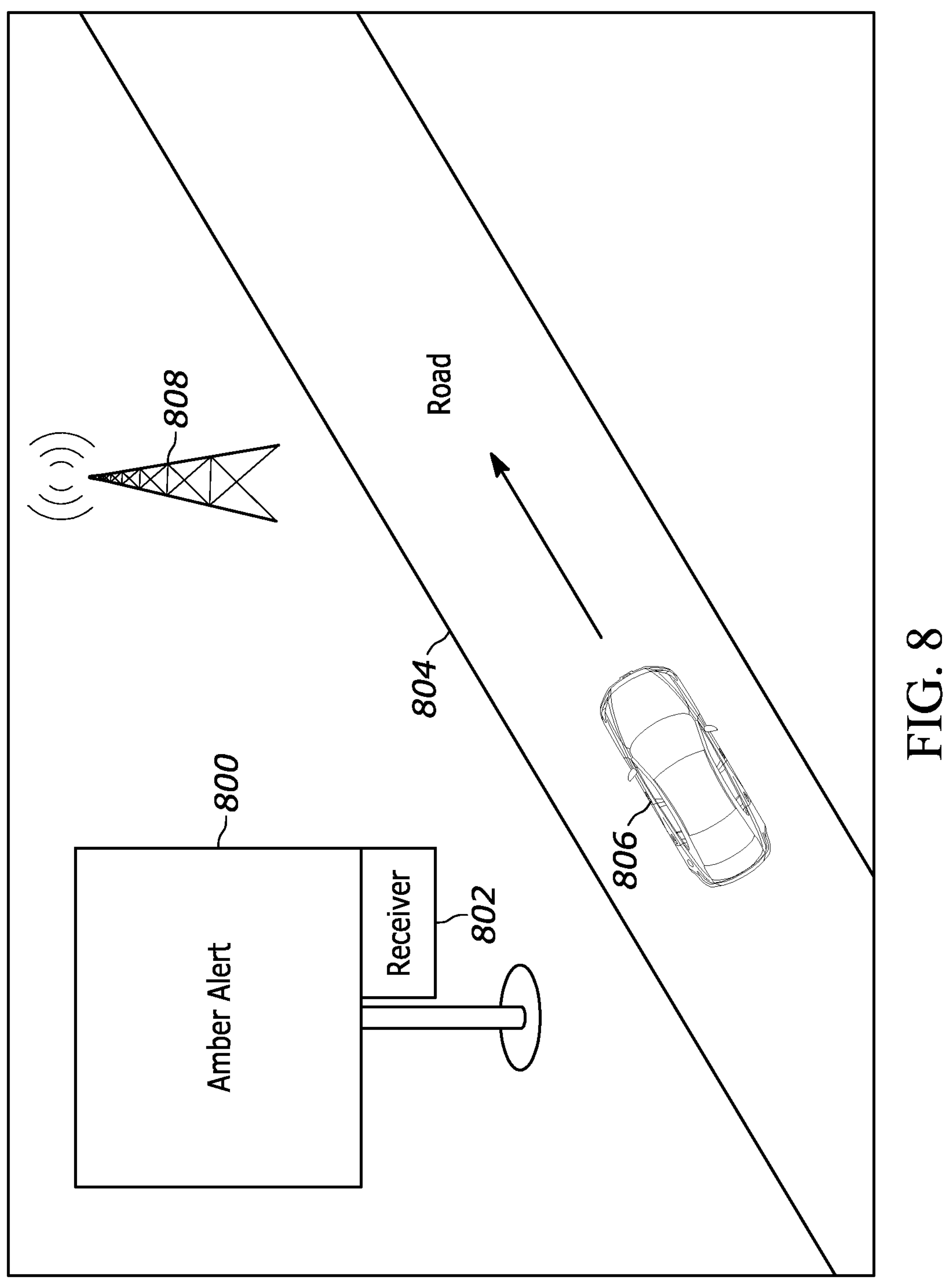
FIG. 8 illustrates an alternate use case for controlling a message on public signage.

Indeed refer now to FIG. 8, in which an electronic sign 800 such as a freeway or other road sign is controlled by an ATSC 3.0 receiver 802 to present a message such as an amber alert to distract drivers of vehicles 806 on a road 804 with a message. The message is sent to the receiver 802 from one or more ATSC 3.0 terrestrial broadcast transmitters 808. Instead of a domestic dispute message, the message content may be about road conditions or simply may be "public service" messages to hector drivers to buckle up and not to drink and drive.

Figure 9:
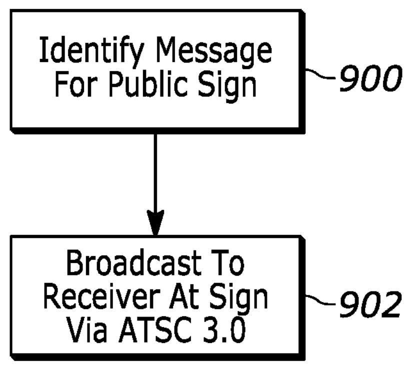
FIG. 9 illustrates example logic in example flow chart format consistent with FIG. 8.

FIG. 9 illustrates transmitter logic consistent with FIG. 8. Commencing at block 900, a message is identified for presentation on a public sign, which message may be associated with the ID of the sign on which it is to be presented. Proceeding to block 902, the message is broadcast to all receivers in the transmission area along with, if desired, the sign ID so that the message may be presented only by the sign associated with the sign ID. Or, all signs with ATSC 3.0 receivers receiving the message may present the message.

Figure 10:
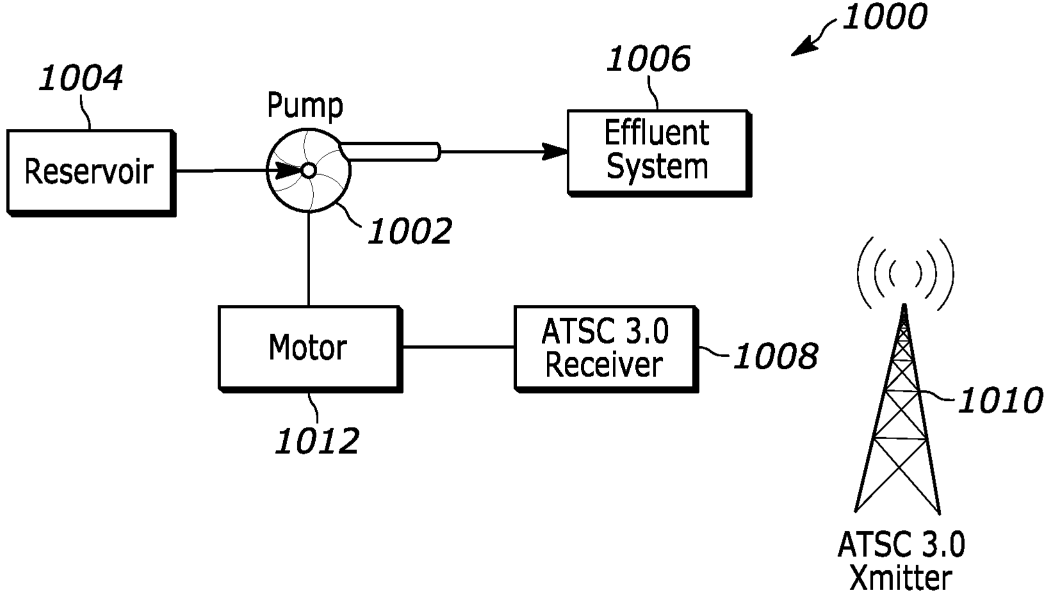
FIG. 10 illustrates another alternate use case for controlling a pump at a pumping station.

FIG. 10 illustrates a pumping station 1000 such as a potable water station or sewage station or recycled water station in which one or more pups 1002 take suction from one or more reservoirs 1004 and discharge effluent to one or more effluent systems 1006, e.g., in the case of a potable water station, to the public potable water supply. One or more ATSC 3.0 receivers 1008 may receive one or more messages from one or more ATSC 3.0 terrestrial broadcast transmitters 1010 to actuate the motor 1012 of the pump 1002 to start the pump or to stop the pump as the case may be.

Figure 11:
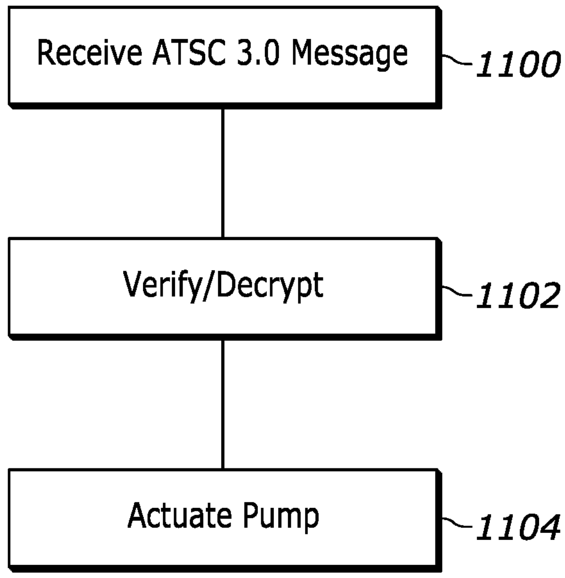
FIG. 11 illustrates example logic in example flow chart format consistent with FIG. 10.

FIG. 11 illustrates receiver logic consistent with FIG. 10. Commencing at block 1100, a message is received via ATSC 3.0 wireless transmission by the receiver 1008 shown in FIG. 10. When signing/encryption is implemented, the signature is verified and the message decrypted at block 1102 and assuming verification and decryption are successful, the pump 1002 is activated (or deactivated as dictated by the message) at state 1104.

It will be appreciated that whilst present principals have been described with reference to some example embodiments, these are not intended to be limiting, and that various alternative arrangements may be used to implement the subject matter claimed herein.

What is claimed is:

1. An apparatus, comprising:

at least one computer readable storage medium that is not a transitory signal and that comprises instructions executable by at least one processor system comprising one or more processors to:

receive an advanced systems television committee (ATSC) 3.0 message; and responsive to receipt of the ATSC 3.0 message, actuate a physical barrier to move from a closed configuration to an open configuration;

wherein the apparatus comprises at least one ATSC 3.0 receiver and the instructions are executable to:

configure the ATSC 3.0 receiver in a sleep mode;

periodically wake up the ATSC 3.0 receiver to check for a wake-up bit in a digital TV broadcast;

responsive to receiving the wake-up bit, actuate a battery powered and/or solar assisted system to open the physical barrier.

2. An apparatus comprising:

at least one processor system comprising one or more processors, the at least one processor system being configured to:

receive an advanced systems television committee (ATSC) 3.0 message; and responsive to receipt of the ATSC 3.0 message, control at least one fluid pump at a pumping station to pump fluid, wherein the pumping station comprises at least one public recycled or potable water supply station.

3. An apparatus comprising:

at least one processor system comprising one or more processors, the at least one processor system being configured to:

receive an advanced systems television committee (ATSC) 3.0 message; and responsive to receipt of the ATSC 3.0 message, control at least one fluid pump at a pumping station to pump fluid, wherein the pumping station comprises at least one public sewage station.

4. An apparatus comprising:

at least one processor system comprising one or more processors, the at least one processor system being configured to:

receive an advanced systems television committee (ATSC) 3.0 message; and responsive to receipt of the ATSC 3.0 message, control at least one fluid pump at a pumping station to pump fluid, wherein the message is digitally signed and the at least one processor system is configured to verify a signature of the ATSC 3.0 message.

5. An apparatus comprising:

at least one processor system comprising one or more processors, the at least one processor system being configured to:

receive an advanced systems television committee (ATSC) 3.0 message; and responsive to receipt of the ATSC 3.0 message, control at least one fluid pump at a pumping station to pump fluid, wherein the message is encrypted and the at least one processor system is configured to decrypt the ATSC 3.0 message.

6. An apparatus comprising:

at least one processor system comprising one or more processors, the at least one processor system being configured to:

receive an advanced systems television committee (ATSC) 3.0 message; and responsive to receipt of the ATSC 3.0 message, control at least one fluid pump at a pumping station to pump fluid, wherein the ATSC 3.0 message is received via terrestrial broadcast.

7. An apparatus comprising:

at least one processor system comprising one or more processors, the at least one processor system being configured to:

receive an advanced systems television committee (ATSC) 3.0 message; and responsive to receipt of the ATSC 3.0 message, control at least one fluid pump at a pumping station to pump fluid, wherein the ATSC 3.0 message is received via wireless Internet transmission protocols.

8. An apparatus comprising:

at least one processor system comprising one or more processors, the at least one processor system being configured to:

receive an advanced systems television committee (ATSC) 3.0 message; and responsive to receipt of the ATSC 3.0 message, control at least one fluid pump at a pumping station to pump fluid;

wherein the apparatus comprises at least one ATSC 3.0 receiver and the at least one processor system is configured to:

configure the ATSC 3.0 receiver in a sleep mode;

periodically wake up the ATSC 3.0 receiver to check for a wake-up bit in a digital TV broadcast;

responsive to receiving the wake-up bit, actuate the at least one fluid pump.

9. A method, comprising:

receiving an advanced systems television committee (ATSC) 3.0 message; and responsive to receiving the ATSC 3.0 message, controlling at least one fluid pump at a pumping station to pump fluid, wherein the pumping station comprises one or more of: at least one public recycled or potable water supply station, at least one public sewage station.

10. A method, comprising:

receiving an advanced systems television committee (ATSC) 3.0 message; and responsive to receiving the ATSC 3.0 message, controlling at least one fluid pump at a pumping station to pump fluid, wherein the ATSC 3.0 message is received via terrestrial broadcast.

* * * * *